US007729496B2

(12) United States Patent
Hacigumus (10) Patent No.: US 7,729,496 B2
(45) Date of Patent: Jun. 1, 2010

(54) EFFICIENT KEY UPDATES IN ENCRYPTED DATABASE SYSTEMS

(75) Inventor: Vahit Hakan Hacigumus, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 11/364,443

(22) Filed: Feb. 28, 2006

(65) Prior Publication Data

US 2007/0201700 A1 Aug. 30, 2007

(51) Int. Cl.
*H04L 9/00* (2006.01)
*H04L 9/08* (2006.01)
*H04L 9/32* (2006.01)
*G06F 11/30* (2006.01)
*G06F 7/00* (2006.01)
*G06F 17/30* (2006.01)
*G06F 17/00* (2006.01)

(52) U.S. Cl. .................. 380/277; 380/44; 713/189; 713/193; 707/8; 707/9

(58) Field of Classification Search ............ 380/277, 380/281, 279; 707/8; 713/171, 189, 193
See application file for complete search history.

(56) References Cited

U.S. PATENT DOCUMENTS

| 5,081,677 | A |   | 1/1992  | Green et al.             |
|-----------|---|---|---------|--------------------------|
| 5,095,421 | A | * | 3/1992  | Freund ............ 718/101 |
| 5,404,403 | A |   | 4/1995  | Bright et al.            |
| 5,897,641 | A | * | 4/1999  | Ruddy et al. ....... 707/202 |
| 5,940,507 | A | * | 8/1999  | Cane et al. ......... 713/165 |
| 6,009,425 | A | * | 12/1999 | Mohan ................ 707/8 |
| 6,026,412 | A | * | 2/2000  | Sockut et al. ....... 707/200 |
| 6,405,315 | B1 | * | 6/2002 | Burns et al. ........ 713/190 |
| 6,658,566 | B1 |   | 12/2003 | Hazard                  |
| 7,421,741 | B2 | * | 9/2008 | Phillips et al. ...... 726/30 |
| 7,565,683 | B1 | * | 7/2009 | Huang et al. .......... 726/1 |

(Continued)

OTHER PUBLICATIONS

Hacigumus et al., "Performance-Conscious Key Management in Encrypted Databases", Research Directions in Data and Applications Security XVIII, IFIP TC11/WG 11.3 Eighteenth Annual Conference on Data and Applications Security, Jul. 25-28, 2004, Sitges, Catalonia, Spain, 95-109.*

(Continued)

*Primary Examiner*—Emmanuel L Moise
*Assistant Examiner*—Hilary Branske
(74) *Attorney, Agent, or Firm*—Karl O. Hesse; Daniel E. Johnson (57) ABSTRACT

A system, method and programmed article of manufacture to perform efficient encryption key updates in encrypted database-as-a-service (DAS) environments using a key registry and key locks. A database as a service environment allows organizations to send their data management infrastructures to a database service provider. The service provider employs data encryption techniques to ensure the privacy of hosted data. The security of encryption techniques relies on the confidentiality of the encryption keys. The dynamic nature of the encrypted database in the DAS model adds complexity and raises specific requirements on key management techniques. The solution is provided by the key registry and by the key update lock, key management process and log management process to allow data update access to data concurrently with encryption key update for the same data.

5 Claims, 9 Drawing Sheets

U.S. PATENT DOCUMENTS

2004/0122842 A1* 6/2004 Friske et al. .............. 707/102
2004/0243799 A1* 12/2004 Hacigumus et al. ......... 713/150
2004/0243816 A1* 12/2004 Hacigumus et al. ......... 713/193

OTHER PUBLICATIONS

Hakan Hacigumus et al. "Efficient Execution of Aggregation Queries over Encrypted Relational Databases" Proceedings of 9th Int'l Conference DASFAA 2004 March 17-19, 2004, Jeju Island, Korea.

Hakan Hacigumus et al. "Ensuring the Integrity of Encrypted Databases in the Database-as-a-Service Model", IFIP TC11/WG11.3, 17th Annual Working Conference on Data and Applications Security, August 4-6, 2003, Estes Park, Colorado, USA.

Hakan Hacigumus et al. "Efficient Key Updates in Encrypted Database Systems" Second VLDB Workshop, SDM 2005 in Trondheim, Norway, Sep. 2-3, 2005.

* cited by examiner

Relation emp

| eid | ename | salary | addr | did |
|-----|-------|--------|-------|-----|
| 23 | Tom | 70K | Maple | 40 |
| 860 | Mary | 60K | Main | 80 |
| 320 | John | 23K | River | 35 |
| 200 | Sarah | 55K | River | 10 |

FIG. 4

Encrypted representation emp$^S$ of emp

| RID | KID | etuple | eid$^{id}$ | ename$^{id}$ | salary$^{id}$ |
|-----|-----|--------|------|--------|----------|
| 1 | 45 | =*?Ew@R*((ii=+,-... | 2 | 19 | 81 |
| 2 | 78 | b*((ii(*?Ew@=I,r... | 4 | 31 | 59 |
| 3 | 65 | w@=W*((ii(*?E:,j... | 7 | 59 | 22 |
| 4 | 52 | ffT* @=U(i?G+,a... | 8 | 49 | 59 |

FIG. 5

Key Registry

| KID | Correspondence | Expiration | Cardinality | Key |
|---|---|---|---|---|
| 45 | mgr.RID:[1,200] | 06/12/05 | 120 | the key |
| 92 | mgr.RID:[1,200] | 06/12/05 | 30 | the key |
| 52 | proj.RID:[1,500] | 06/09/05 | 275 | the key |
| 77 | emp.RID:[1,300] | 07/01/05 | 130 | the key |
| 23 | mgr.RID:[201,500] | 06/08/05 | 40 | the key |

Lock mode compatibility matrix

|    | S | X | U | KU |
|----|---|---|---|----|
| S  | ✓ | ✗ | ✓ | ✓  |
| X  | ✗ | ✗ | ✗ | ✗  |
| U  | ✗ | ✗ | ✗ | ✗  |
| KU | ✓ | ✓ | ✓ | ✗  |

EFFICIENT KEY UPDATES IN ENCRYPTED DATABASE SYSTEMS

FIELD OF THE INVENTION

The present invention relates generally to the field of cryptography and more specifically to cryptographic key management in encrypted database systems.

DESCRIPTION OF BACKGROUND ART

In today's systems, the commodity pricing of processors, storage, network bandwidth, and basic software is continuously reducing the relative contribution of these elements to the total lifecycle cost of computing solutions. Operating and integration costs are increasing, in comparison. The research community has responded by working on approaches to automated system administration. Increasingly, large companies are consolidating data operations into extremely efficiently administered data centers.

The Database-as-a Service (DAS) model as described in US Patent Application Publication number US2004/0243816 is one example of this trend. In the DAS model, the client's database is stored at the service provider. The provider is responsible for providing adequate CPU, storage, and networking resources required to run database operations, in addition to the system administration tasks such as backup, recovery, reorganization etc.

A fundamental challenge posed by the DAS model is that of database privacy and security. In the DAS model, the user data resides on the premises of the database service provider. Most companies and individuals view their data as an asset. The theft of intellectual property already costs organizations a great amount of money every year. Therefore, the owner of the data needs to be assured that the data are protected against malicious attacks from the outside of the service provider. In addition to this, recent studies indicate that 40% of those attacks are perpetrated by the insiders. Hence, the second and more challenging problem is the privacy of the data when even the service provider itself is not trusted by the owner of the data. Data encryption is employed to ensure the privacy of the users' data.

The security of any encryption technique relies on the confidentiality of the encryption keys. Hence, key management plays an essential role in a database-as-a-service environment. Cryptographic key update transactions are an essential part of the database systems and applications. Each update transaction requires at least one invocation of the encryption function to encrypt the data in the system. The actual number of invocations depends on various factors such as the data unit subject to the encryption, i.e., the granularity of the encryption, specifics of the transaction, e.g., an insert only transaction, a transaction on a number of data objects, etc. It is known that encryption is a CPU intensive process. Therefore the key update transactions may hold locks on the certain set of database records for an extended period of time causing a decline in the system performance. Re-keying large amounts of data entails significant encryption costs and interferes with the other transactions thereby causing performance degradation in the system.

SUMMARY OF THE INVENTION

Embodiments of the present invention include a method, system and program product that accomplish data access and encryption key management with improved efficiency.

In a preferred embodiment key management is provided for generating and storing data encryption keys used by the client computer to encrypt data and log management is provided for allowing data to be updated by an application program while an encryption key protecting the data is concurrently being changed.

In a further embodiment, a log is provided for recording the existence of a key update lock and a data update lock on the same record and log management delays the completion of a data update of the record until the key update has been completed.

In another aspect of the invention, a server computer receives a key update request for access to a record in encrypted data storage. A key update lock is placed on the record and the record is sent to a client computer for re-encryption with a new key. When a data update request for access to the same record is received, data update lock is placed on the record. Conflict information is sent to the client computer. After an acknowledgement is received from the client computer signaling that the client computer has logged the conflict, the same record can be sent the client computer for a data update transaction to be executed concurrently with the transaction changing the encryption key.

These and other advantages of the invention are accomplished by the key management and lock management methods of the invention which are based upon the novel key registry and key update conflict resolution system explained in detail in the following description of a best mode for making and using the instant invention.

DESCRIPTION OF THE PREFERRED EMBODIMENT

Figure 1:
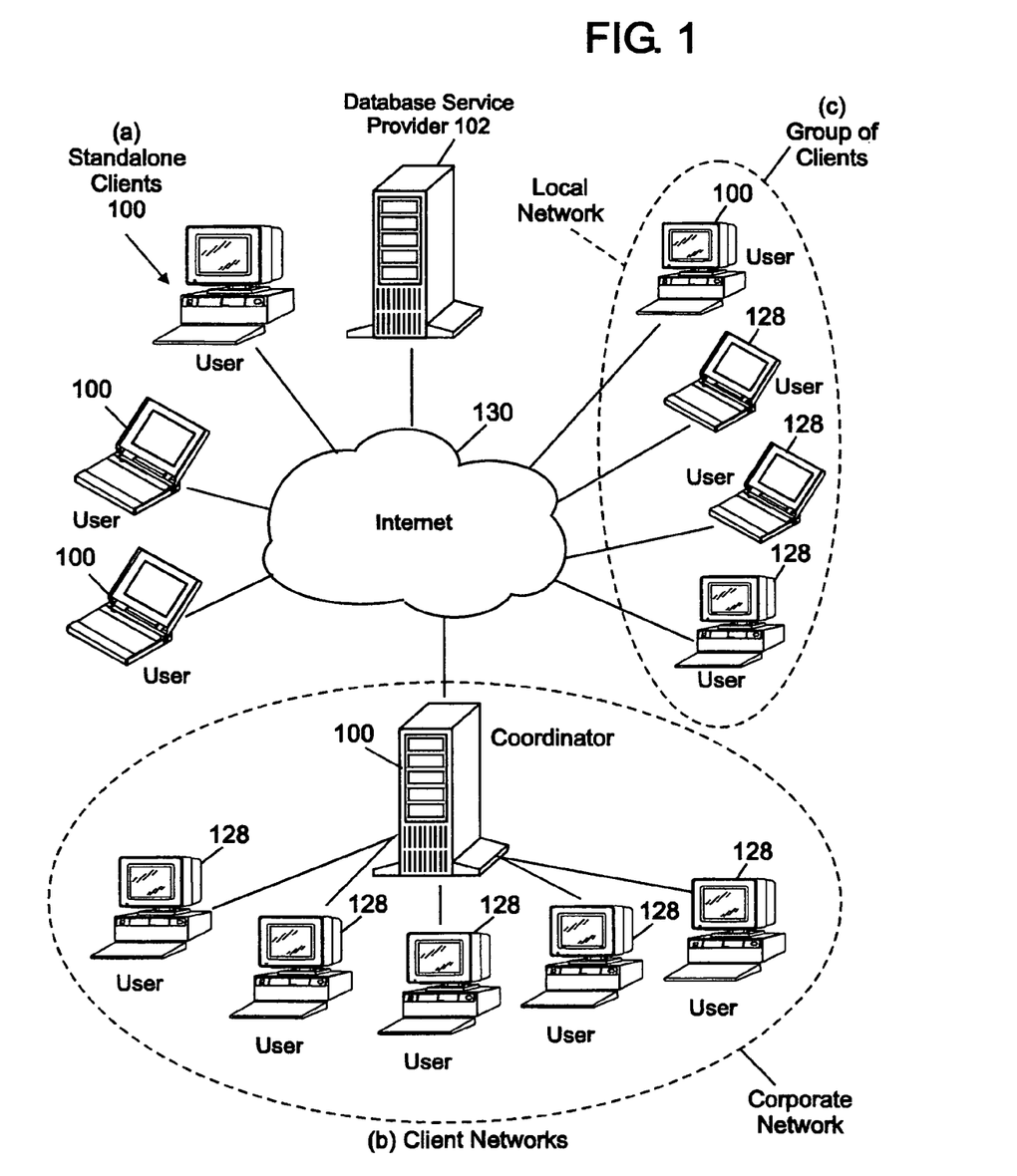
FIG. 1 is a block diagram illustrating the architecture of a database-as-a-service environment in which the instant invention finds utility.

Referring now to the drawings, and first to FIG. 1, the system of the present invention finds utility and its best mode in a Database-as-a-Service (DAS) model as described in US Patent Application Publication number US2004/0243816 which is hereby incorporated by reference. In the DAS model, the client's database is stored at a service provider. The provider is responsible for providing adequate CPU, storage, and networking resources required to run database operations, in addition to the system administration tasks such as backup, recovery, reorganization etc.

FIG. 1 is block diagram that illustrates the basic communication relationship between the server computer and three forms of client computer connections via the network 130. This system involves trusted clients and an un-trusted server. Three categories of client connections are shown: standalone clients 100 at (a), a group of individual clients 100 at (b), and a network (c) of clients 128. Each connection has implications on the characteristics of the system including the control of, index management, key management, and query processing.

In the standalone clients connection, shown in FIG. 1 at (a), each client 100 is a single node connecting to the service provider individually. The client does not directly share the data with the other clients. A possible example for the clients of this type is personal users accessing services, such as e-mail, rent-a-spreadsheet etc., via a web browser or a lightweight application interface.

In the client network connection shown in FIG. 1 at (b), the client of the service is a network rather than the individual nodes. A characteristic example for this architecture is larger corporations, which maintain their own network infrastructure as corporate networks. In this connection, the nodes inside the network utilize a connection point or multiple points to communicate with the service provider. In this connection, the connection point client 100 is called the coordinator node. The coordinator node is responsible for a set of operational tasks, such as maintaining metadata information required to execute queries directly over encrypted data, executing transactional semantics in the multi-tier client/server environment, and the key management tasks of the invention.

In the Group of Clients connection shown in FIG. 1 at (c), multiple clients 100 have access to the same service individually. Those clients are somehow related to each other. The relationship can be organizational, i.e., the group of clients belonging to an organization, or data sharing or both. A typical example for this model is small companies, which have multiple but a limited number of users. They do not want to or need to maintain an integrated network infrastructure containing the coordinator nodes as in client networks case. Nonetheless, they need to enable collaboration among the user nodes in the organization as the users or employees of them would be sharing the data in terms of querying and updating and are related by business means. Therefore the user nodes are connected to each other to share local information, such as the metadata. Inherently this information is managed in a distributed fashion.

Figure 9:
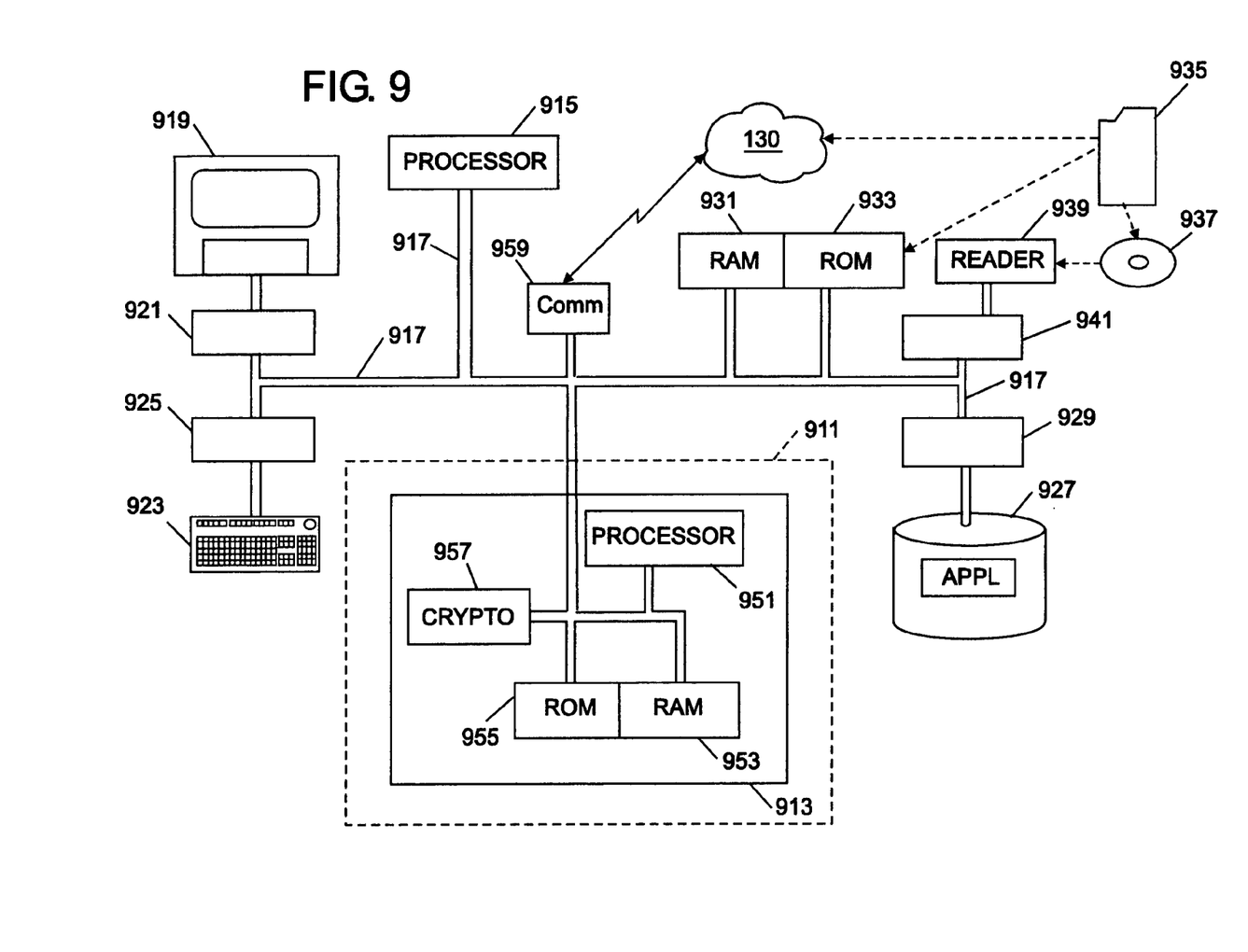
FIG. 9 shows an example computer of the preferred embodiment.

Referring now to FIG. 9, for the purpose of describing the present invention in the context of the preferred embodiment, a typical personal computer architecture is shown, such as the configuration used in many personal computers used as client sites and is also representative of a server computer.

A microprocessor 915 is connected to a bus 917 which comprises a set of data lines, a set of address lines and a set of control lines. A plurality of I/O devices including memory and storage devices are connected to the bus 917 through separate adapters. The I/O devices may be standard features of the personal computer, or plug-in options. For example, these devices may include a display 919 connected through a graphics adapter 921, a keyboard 923 connected through an adapter 925 and a hard disk drive 927 connected through adapter 929. The other devices are either included as part of the personal computer or are available as plug-in options. The random access memory (RAM) 931 and the read-only memory (ROM) 933 are included as standard equipment in a personal computer, although additional random access memory to supplement RAM 931 may be added via a plug-in memory expansion option.

As shown in FIG. 9, a program 935 implementing the method of the invention as shown in the remaining drawings is advantageously embodied as an article of manufacture by embedding the program into compact disc 937, or other portable storage media including communication medium such as the internet 130 which is connected through adapter 959. Media 937 can be read by reader 939 connected to bus 917 by adapter 941. Further, the program 935 may be embodied as a special purpose apparatus by storing the program's executable instructions in RAM 931, ROM 933, or a combination of both and or in DASD 927, accessible by the microprocessor 915 via adapter 929, for execution by microprocessor 915.

In addition to use with the main microprocessor 915, the invention may be advantageously employed in special purpose devices such as the security card 911, also referred to as a cryptographic adapter 911, which is connected to bus 917. Again the program 935 embodying the method of the invention may be implemented as a special purpose apparatus by storing the program's executable instructions in RAM 953, ROM 955, or a combination of both and/or loaded into RAM 953 from DASD 927 as described above. Cryptographic adapter 911 also contains a cryptographic processing module 957 for efficiently executing algorithms such as the Data Encryption Standard (DES) algorithm and the Rivest Shamir & Adleman (RSA) algorithm as examples of available algorithms.

Figure 2:
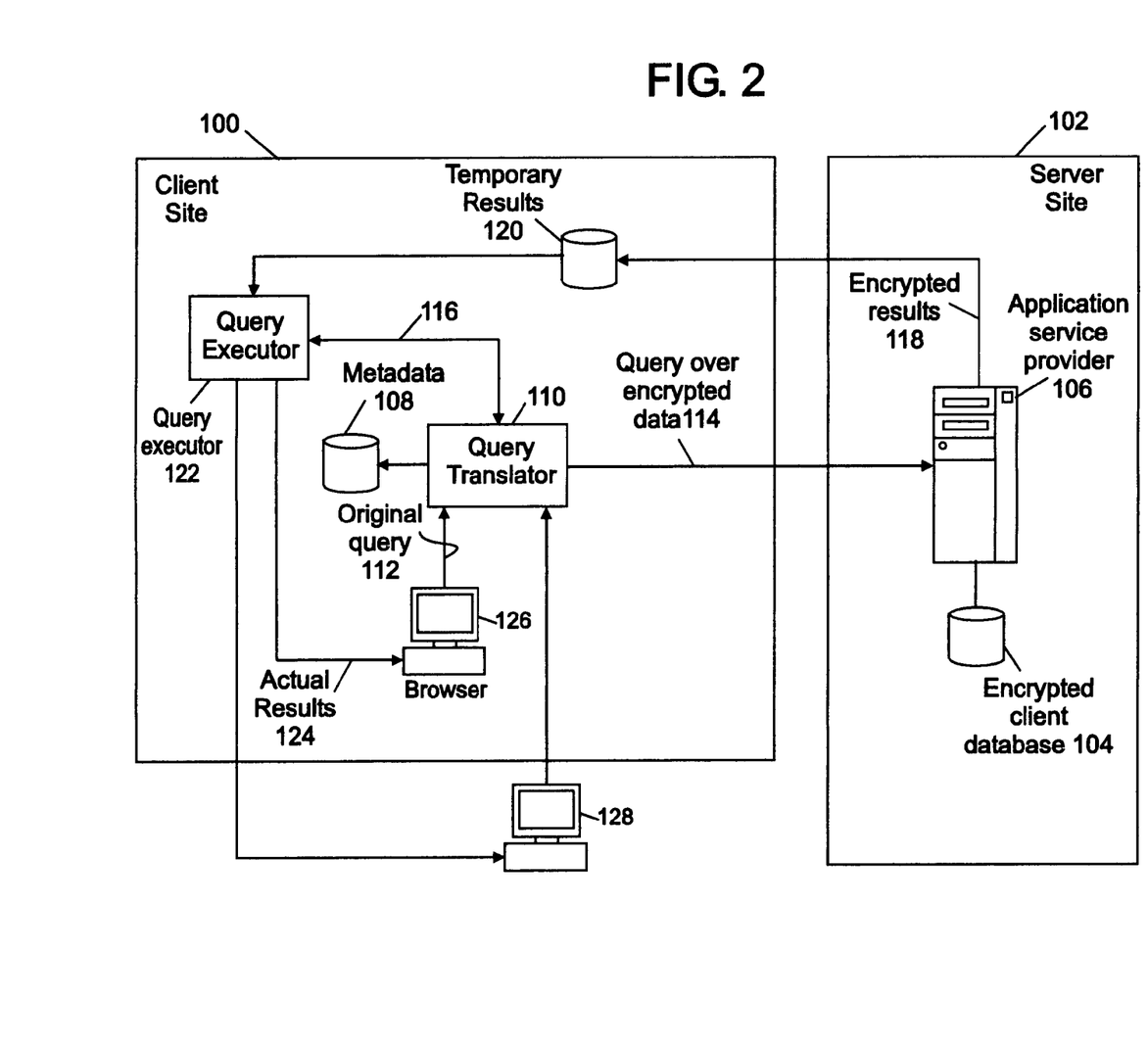
FIG. 2 is a block diagram illustrating the control flow of a database-as-a-service environment in which the instant invention finds utility.

FIG. 2 shows the control flow of a database-as-a-service system. In this system there are three fundamental entities. A client computer 100 encrypts data and stores the encrypted data at a server computer 102 in an encrypted client database 104 managed by an application service provider 106. The encrypted client database 104 may be augmented with additional information called the index, which allows a certain amount of query processing to occur at the server computer 102 without jeopardizing data privacy. The client computer 100 also maintains metadata 108 which is used by a query translator 110 for translating the user query 112 into different portions, i.e., a query over encrypted data 114, for execution on the server computer 102, and a query over decrypted data 116, for execution on the client computer 100. The server computer 102 generates an encrypted intermediate result set 118, which is provided to the client computer 100 and stored as temporary results 120. The client computer 100 includes a query executor 122 that decrypts the temporary results 120 and performs the query over decrypted data 116 in order to generate actual results 124 for display 126 to the user. When the client 100 is a coordinator, the actual results are provided to other users 128 who may have entered the original query.

Specifically, data from a client computer 100 is encrypted by the client computer and hosted by a server computer 102, the encrypted data are operated upon by the server computer 102, using one or more operators selected from a group of operators comprising: (a) inequality logic operators, (b) aggregation operators, and (c) wildcard matching operators, to produce an encrypted intermediate results set 118, the encrypted intermediate results set 118 is sent from the server computer 102 to the client computer 100, and the intermediate results set 118 is decrypted and filtered by the client computer 100 to produce actual results. In this logic, the group of operators is limited because the encrypted intermediate results set 118, when decrypted, includes inaccuracies therein. Moreover, the client computer 100 applies a set of correction procedures to the decrypted intermediate results set 118 to remove the inaccuracies.

In this environment the client computer 100 maintains the needed encryption key(s), and the data are encrypted by the client computer 100 before it is sent to the server computer 102 for inclusion in the encrypted client database 104. Consequently, the data are always encrypted when it is stored on or processed by the server computer 102. Moreover, at no time are the encryption keys given to the server computer 102, and thus the data can never be decrypted by the server computer 102. Often the client and the user are the same entity.

In other instances, the user 128 is part of an intranet and the client 100 is a coordinator as in FIG. 1(*b*). In the example of FIG. 1(*b*) the user is a client on a network that is connected to the server through a coordinator computer that performs the above described functions for a plurality of client users. One of these client users is shown in FIG. 2 as user client 128.

All of the details of the storage model will not be repeated here, since it is thoroughly discussed in US Patent Application Publication number US2004/0243816 as well as in H. Hacigumus, B. Iyer, C. Li, and S. Mehrotra; Executing SQL over Encrypted Data in Database Service Provider Model—Proc. of ACM SIGMOD, 2002.

Rather, only the necessary notations to explain the constructs which are used as references to the records and assigned by the database manager, as it is done in most of the commercial database products are set out in detail.

The client's data are stored at the server in an encrypted fashion in the DAS model. For each relation $R(A1, A2, \ldots, An)$, an encrypted relation: $R^S$ (RID, KID, etuple, $P_1^{id}$, $P_2^{id}$, ..., $P_i^{id}$), is stored, on the server, where $1=i=n$. Here, an etuple stores an encrypted string that corresponds to a tuple in a relation R. Each attribute $P_i^{id}$ stores the partition index for the corresponding attribute Ai that will be used for query processing at the server.

Figures 3, 4:
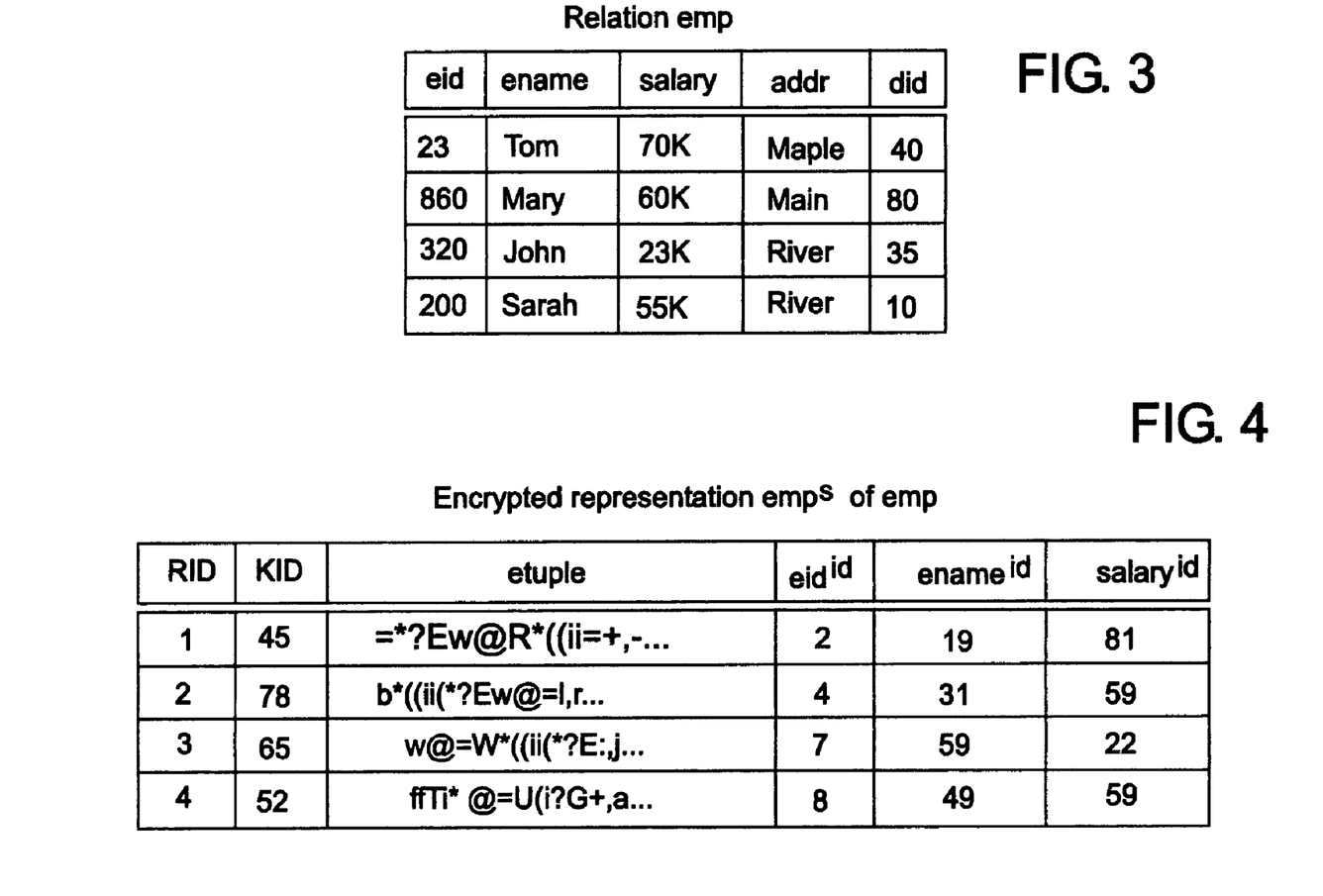
FIG. 3 is a table showing an example relation of employee data.
FIG. 4 is a table showing the encrypted relation for employee data as it is stored on the server computer.

For example, consider the relational employee table emp, shown in FIG. 3, that stores information about employees. In FIG. 3, row 1 shows an employee ID 23, employee name Tom, salary 70 k, employee address Maple and an employee department ID of 40. This emp table is mapped to a corresponding table, shown in FIG. 4, for storage at the server: $emp^s$ (RID, KID, etuple, $eid^{id}$, $ename^{id}$, $salary^{id}$). Etuple is the encrypted relational data of a row of FIG. 3. Accordingly a tuple is the decrypted encrypted relational data.

The RID of FIG. 4 represents the record identifier, which is a unique number created by the client for each record containing a tuple. The RIDs are not the same as other unique identifiers that may also be assigned to identify data items in FIG. 3. Instead, these RIDs also uniquely identify the records, and they are created and assigned by the client to facilitate the method of the instant invention.

Referring again to FIG. 4, the KID represents the key identifier, which is also created and assigned by the client. The KID indicates which key is used to encrypt the etuple of the corresponding tuple. The use of KIDs is described in more detail below.

The column etuple shown in FIG. 4 contains the string corresponding to the encrypted tuples in the relation emp of FIG. 3. For instance, the first tuple is encrypted to "=*?Ew@R*((ìi=+,- . . . " that is equal to Ek(1,23,Tom,70 K,Maple,40), where E is a deterministic encryption algorithm with key k. Any deterministic encryption technique such as AES, DES etc., can be used to encrypt the tuples. The column $eid^{id}$ corresponds to the index on the employee ids. The details of the creation of these index values is shown in US Patent Application Publication number US2004/0243816 identified above.

Figure 7:
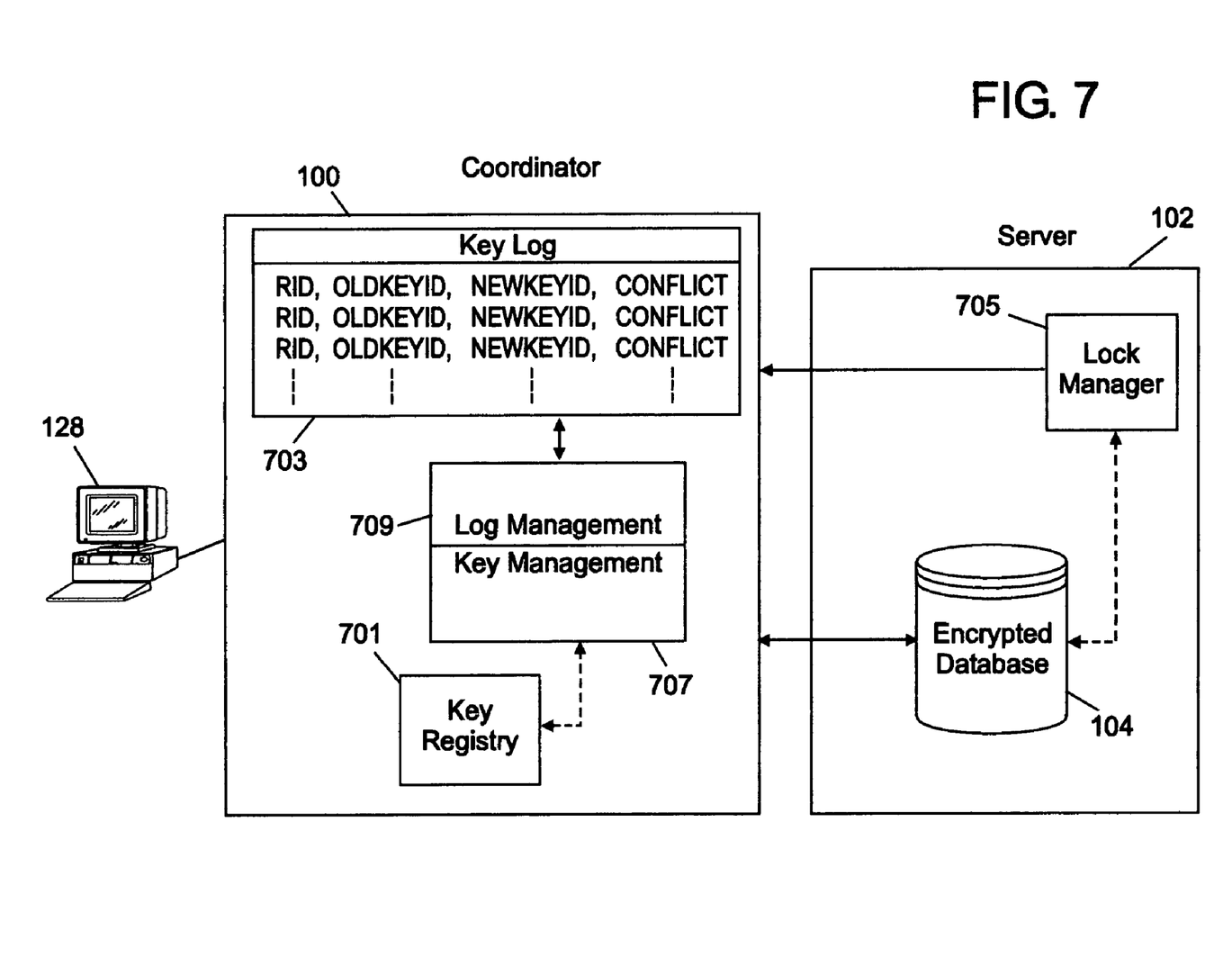
FIG. 7 is a block diagram showing the encryption key management system of the invention used in a coordinator connected network.

Referring now to FIG. 7, key management of the invention will be described.

Key management is a group of policies and procedures that regulate the maintenance of the encryption keys within a system.

The following is a description of specific key management functions in the context of the DAS environment, namely: key generation, key installation, key distribution, key assignment granularity and key update according to the instant invention. A novel means in the form of a key registry used to store the encryption keys in the system according to the invention is then described with respect to FIG. 5.

A key can be used to encrypt different database objects in the database, such as a table or a row. This is called the assignment granularity of the key. The selection of granularity has its own pros and cons, depending on the system setup, limitations on computing and storage of the client etc., and the security requirements. For the purpose of the description of the preferred embodiment it is assumed that the key assignment granularity is vertical-partitions-level.

In vertical-partitions-level key assignment granularity, a group of database rows as shown in FIG. 4 are encrypted with the same key. In the most extreme case, a different key is used for each row. Alternatively, the rows can be grouped. The groups are defined as the non-overlapping intervals on the RIDs. All rows in a value interval are encrypted with the same key. For example, the key k1 can be used to encrypt the rows of employee (emp) table, whose manager (mgr) RID values fall in the range of one to ten, and the key k2 can be used for the rows, whose mgr.RID values fall in the range of eleven to twenty five.

Key generation involves the creation of the encryption keys that meet the specifications of the underlying encryption techniques. These specifications define the properties, such as size, randomness, that the keys should have. The medium in which keys are generated is of particular interest for the DAS model since the decision has both security and performance implications.

In the DAS environment, according to the invention, there are two places where the key generation may take place. The first option is the client itself and the second option is a network coordinator, which provides the key generation (and possibly additional key management functions) as a service. Note that, the server can not be considered as an option because the server is considered to be an un-trusted party in this environment. For the purpose of describing one embodiment of the preferred embodiment, it is assumed that the client generates the keys.

Once the keys are generated, they need to be made operational and accessible for the authorized users. Key installation defines how and where the keys are stored during their regular use. According to the preferred embodiment of the instant invention, a special data storage named the key registry, is responsible for storing the key information.

After a key is generated, a corresponding entry is created in the key registry. Upon request, the keys are provided to the authorized users. This process is called key distribution. Similar to the case for the key generation function there are different alternatives where the key distribution can be handled, the client site, a trusted third party service provider, and in this case, the server site.

For the standalone client, the client either stores the key registry on its own machine or in encrypted form at the server site, which is unlike the key generation function. The key registry can be encrypted by using a master key and stored at the server securely. When the client needs to use a key, the encrypted key can be down-loaded from the server and be decrypted with the master key. These alternatives are also valid for the client networks and the group of client models.

For the former, the coordinator node can act as a medium for storage and communication with the other users. If the server or a third party server is chosen for the key distribution, user authentication is an issue to address. This can be solved by using a public key. After the key is generated and stored, the key registry can be locked with the public key. This way anyone can request the encrypted key registry but only the authorized users can decrypt using their private key.

The key registry stores all the required information to manage the keys. It has a tabular structure, shown in FIG. 5, which comprises five columns corresponding to KeyID(KID) list, Correspondence, Expiration, Cardinality, and the data encryption key itself, in an indefinite number of rows, each corresponding to a different key that is used in the system.

Figure 5:
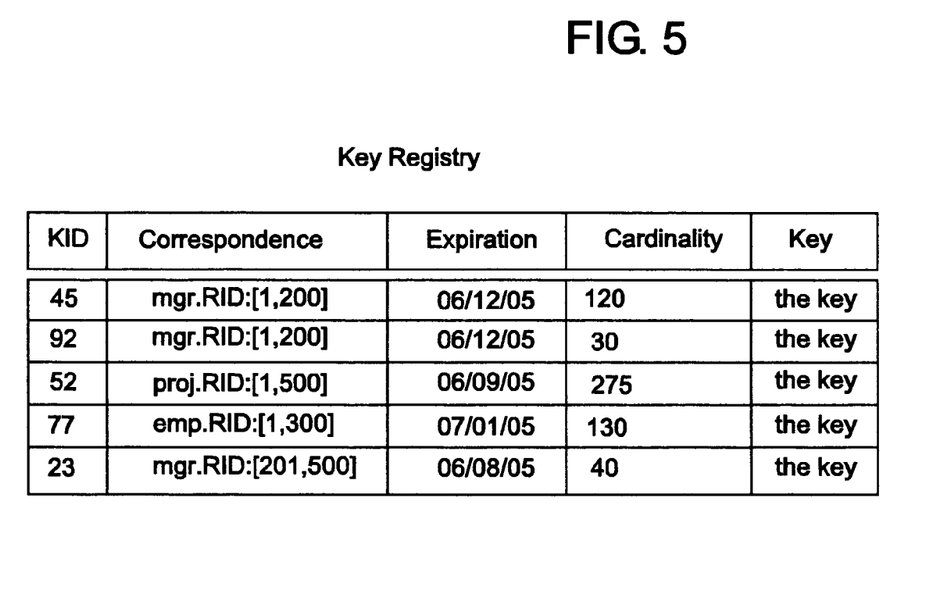
FIG. 5 is an example of entries in a key registry according to the invention.

The column, KeyID(KID) provides a key identifier, which is a numerical value, and is used to identify the corresponding key. To obfuscate the correspondence between the records and the encryption, different KIDs are assigned to the same encryption key, i.e., a key does not need to have a unique identifier. These numbers are just used to make the associations between the records read from the encrypted database tables and the key registry entries. When an encrypted tuple is read from the database (or a tuple is to be inserted into the database) the system should know which key had been used to encrypt the record. The KID column in the encrypted storage provides that information. Maintaining multiple identification numbers for the keys increases the security afforded by the system, especially against certain types of attacks, such as, known-cipher text attacks, and related-key attacks. An adversary cannot directly recognize the etuples, which are encrypted with the same key.

The column labeled Correspondence, indicates the records to which the key is assigned. In the correspondence column of the key registry, the preferred embodiment employs a special notation to indicate the correspondence to the database objects. The notation is:

table name.RID[RID1,RID2]

What is being described is a preferred embodiment of the key registry. Other embodiments will suggest themselves to those of skill in the art to achieve better performance or meet other data storage requirements without departing from the spirit and scope of the instant invention.

The table name specifies the name of the table to which the RIDs belong. RID indicates a set of record identifiers. An RID is associated with a closed interval. For example, [20,50] indicates the continuous interval of values, i.e., RIDs, between 20 and 50.

As an example, in FIG. 5, the first entry defines the encryption key with KID=45. That key is assigned to the records of mgr table whose RIDs are between 1 and 200. The second record in the registry defines another key, KID=92. This key is also used for the same set of records in mgr table. The client will know which key had actually been used when a specific record is fetched from the server along with the KID information.

The column labeled Expiration, specifies the expiration date of the key. It also is possible to use finer granularity in time, such as hours, minutes etc. Using an expiration date limits the life time of a key in the system. This is useful for many reasons in key management and facilitates the creation of key management policies.

The column labeled Cardinality, is essentially the counter for the number of records that have been encrypted with the key. The RID interval defined in the Correspondence column does not give that number but just defines a partition over the RID values domain. The cardinality information can also be used in creation and management of the key management policies like the Expiration information. The system could be designed in a way that it eliminates the keys that are used for very few records for a long period of time or splits the RID intervals that are excessively populated The column labeled The Key, is the field that contains the actual encryption key.

Key update comprises five main steps:

1) Generation and installation of a new key

2) Fetching the etuples that are subject to key change

3) Decryption of the etuples

4) Re-encryption of the etuples with the new key

5) Replacement of the etuples, re-encrypted with the new key

In this method, the records, which are subject to key change are each re-encrypted with a new key. During this process, if a data update transaction is permitted, the update transaction may update a record with new content while the re-encryption process is in progress. The re-encryption process would overwrite the updated value of the record causing inconsistency in the database. The affected record could simply be locked for data update because re-encryption of data is almost the same as actually changing the data but then only a shared access could be concurrently allowed without danger of loss of data integrity.

Usually the client has limited computational and storage power and encryption and decryption are particularly computationally very expensive operations. Therefore, this may lead to a longer duration of key update procedures. If the key update blocks out significant amount of user transactions then the throughput of the system may considerably deteriorate.

In addition, it is important to be judicious about the system resource usage due to key updates. This includes network bandwidth and I/O overhead. For example, choosing a finer granularity of records using a key could speedup the key update with lesser interference with the other transactions. This would, however, cause increased network traffic and message initiation cost since the number of transmission requests increases with the finer granularity.

In order to allow a greater measure of concurrent transaction processing, an aspect of the invention includes a new lock mode called Key Update (KU) lock to efficiently handle the key updates concurrent with other transactions. This is an additional lock mode for the lock manager run by the server. It is assumed that the lock manager uses shared (S), exclusive (X), and update (U) locks for transaction processing. Other possible lock modes, such as IX, IS, which are used in some lock managers, are not important for the description of this embodiment. It is assumed that the lock manager uses record locking granularity. Thus, the lock manager locks a record at a time in a given table.

Shared locks are used to lock a database element for the transactions that access the database element for read only purposes, e.g., scans. Thus, there can be any number of shared locks held on a database element. Exclusive locks are used to lock a database element for update operations. Therefore, there can be one exclusive on a database element. Update locks are used to avoid the deadlocks. If it is known that a transaction will update/delete a fetched record, the transaction asks for a U lock to be acquired. U lock is incompatible with U and X, but is compatible with S. Therefore, no other transaction can obtain a U lock on the same record until the current transaction terminates. If only an S lock were to be obtained, then two different transactions could both obtain S locks. Afterward, both may try to obtain X locks and thereby create a deadlock.

Figure 6:
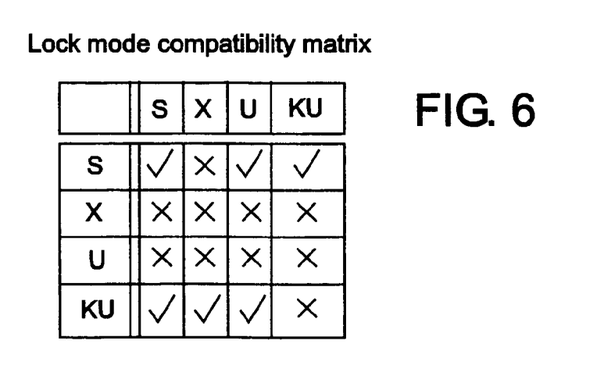
FIG. 6 shows a lock mode compatibility matrix according to the invention.

A lock mode compatibility matrix is shown in FIG. 6. The rows show the currently held lock and the columns show the requested lock. A check mark means that the corresponding modes are compatible, which means that two different transactions may hold a lock simultaneously in those modes on the same record.

Let us consider each column of the matrix to explain the new lock mode. An existing S lock does not conflict with a requested KU lock, because read/scan operations can be executed concurrently with the key update procedure. When a group of etuples are brought in to the coordinator node, the original copies of those are still available at the server for querying. When the qualified etuples (along with RIDs and KIDs) are fetched, the client looks up the key registry and finds the valid key(s) for each etuple and decrypts them. Note that, even if the coordinator node runs a key update over the etuples that are returned as the answer of the query, the content of the data is the same. The only information the user needs to correctly decrypt is the valid keys and this information is provided by the key registry.

Unlike the scans, existing update transactions change the content of the data. There is a clear conflict between the update and key update operations. An update transaction may update a record, encrypted it with the current key, insert it back to the database, and commit while the key update is still running. The key update procedure re-encrypts the old content with the new key and overwrites the updated content, which results in incorrect database state. If the key update transaction commits first, then the update transaction would encrypt the record with the old key and insert it back to the database with the wrong KID value.

However, an X lock request on a record, which is already locked with a KU lock can still be granted. The sequence diagram of the protocol to efficiently handle the update transactions is given in FIG. 8. The conflicts between the X locks and the KU locks are resolved at the coordinator. The server detects a conflict by using the lock modes. Assume that, a record is locked with KU lock for key update and another transaction requests for an X lock on the same record. The server grants the X lock and sends the conflict information to the client. The coordinator records the conflict information in the log, and thereby prevents completion of the X transaction until the key update has completed.

At this point, there are two options to process the update. First, the client asks the coordinator for the new key information. This can be done by using the RIDs. To make the lookup even more efficient, the records are stored in a sorted list or in a tree based data structure based on their RIDs at the coordinator. As stated earlier, RIDs are assigned by the client and they are not used as references to records by the server. The client can encrypt the data updated record with the new key by itself. Note that, the new key information is placed in the key registry before the coordinator starts the processing. Then the client sends a notification to the coordinator and the coordinator drops the corresponding record from the log. Following this, the client inserts the data updated record into the database. Since the coordinator drops the record from the log, the record is not processed by the coordinator anymore thereby preventing the overwriting and inconsistency.

As a second option, the client can transfer the updated record to the coordinator for encryption with the new key. The coordinator first replaces the copy of the old data record with the updated data record, encrypts it with the new key, and inserts it into the database.

The decision between those two alternatives will be made dynamically by considering the performance requirements of the system and the current status of the processes. This procedure allows the system to handle the record updates and the key updates together in that way increasing the system's concurrency performance.

The U locks are managed in the same way that the X locks are managed. A transaction that holds a U lock on a record may escalate the lock mode to X after reading the record. If a KU lock is held on the same record, the lock manager will consider the escalation. Consequently, the U lock request is handled the way an X lock request is handled.

As shown in the lock mode compatibility matrix in FIG. 6, S locks and a new KU lock request do not conflict. However, new KU locks requests are not compatible with any of the other existing X, U, KU locks on the same record. A KU lock request may still be granted if there is a U lock on the record. Nevertheless, the system's performance doesn't benefit from this as the coordinator has to wait until the transaction that holds the U lock terminates.

The following is a description of the system of a preferred embodiment of the invention which is to be read in conjunction with FIG. 7. The structures of FIG. 7 are set out with respect to the network of clients as shown in FIG. 1(*b*) where the requirement for efficient key update is most pronounced. For example, having fewer records using a same key, will speedup the key updates leading to reduced interference with the other transactions. However, this causes increased network traffic and message initiation cost since the number of transmission requests increases with the finer granularity. It will be understood that the method extends to the other classes in the system, namely; stand alone clients shown at FIG. 1(*a*) and the group of clients shown at FIG. 1(*b*).

In this embodiment, the coordinator performs the functions of key management 707 and log management 709. The coordinator client maintains the key registry 701 and a key log 703 data structures for these functions, for all of the users 128. The coordinator initiates the key update processes based on the system key update policies. Those policies are reflected in the expiration and the cardinality fields of the key registry 701.

The Key log 703 is another tabular storage structure that is maintained by the coordinator for efficient control of the keys being used when both a key update and a data update transaction are executing concurrently.

The key log consists of four columns: <RID, old key, new key and conflict indicator>. RID is the record identifier for a record in the database as described above. Old key is the encryption key ID that was used to encrypt the record and new key is the key ID that will be used to identify the encryption key for re-keying. The conflict indicator is set when a data update transaction has been permitted to execute after a key update transaction has been initiated. The preferred embodiment of the invention makes use of this structure to keep track of conflicts between data update operations and the key updates.

The server runs a lock manager 705 that implements the procedures described above with respect to the key update method of the invention. Essentially, the lock manager implements the new lock mode, called key update lock, and resolves conflicts between the data and key update lock modes according to the method of the invention as shown in the matrix of FIG. 6.

Figure 10:
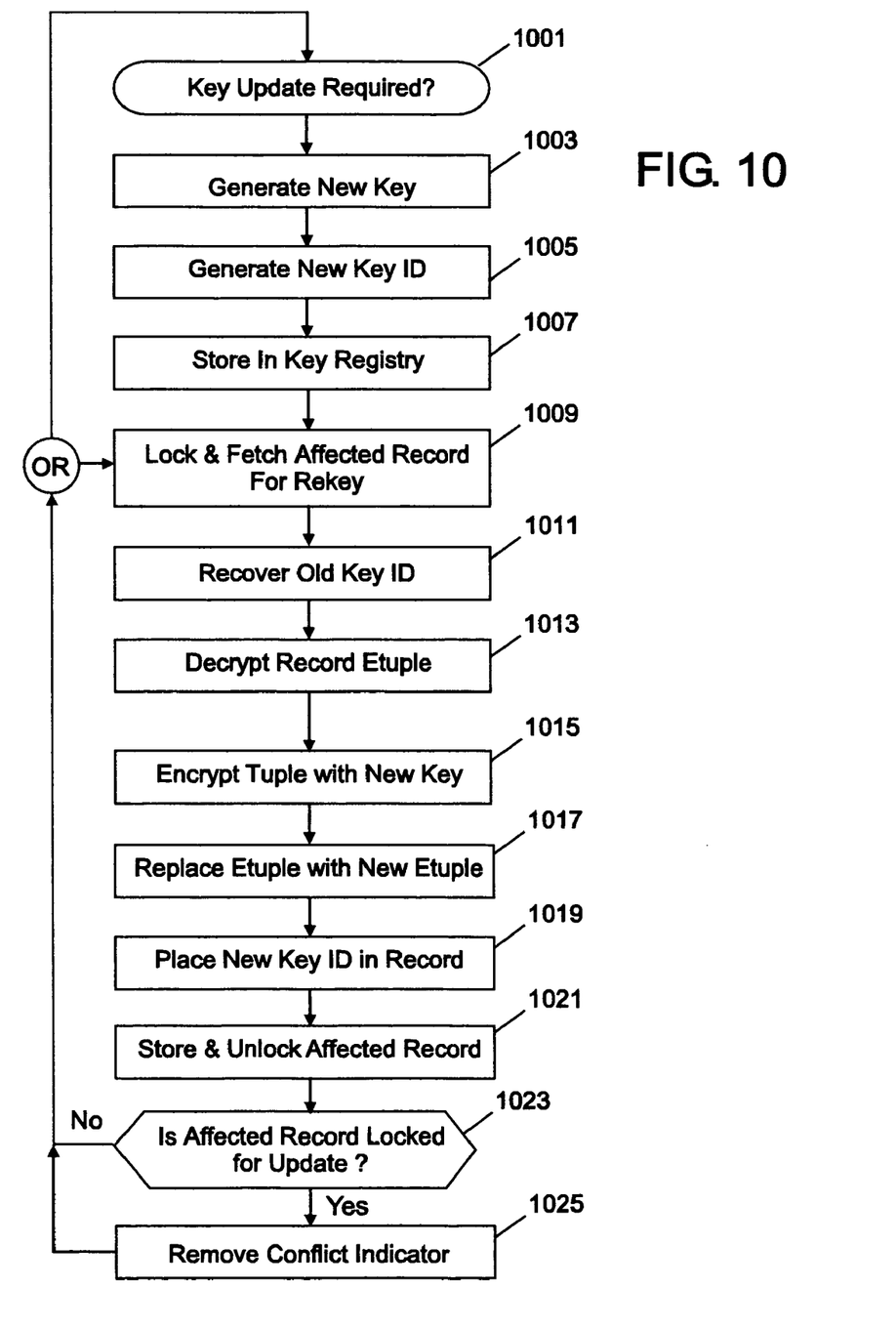
FIG. 10 shows a flow chart of the re-key process of the invention.
Figure 11:
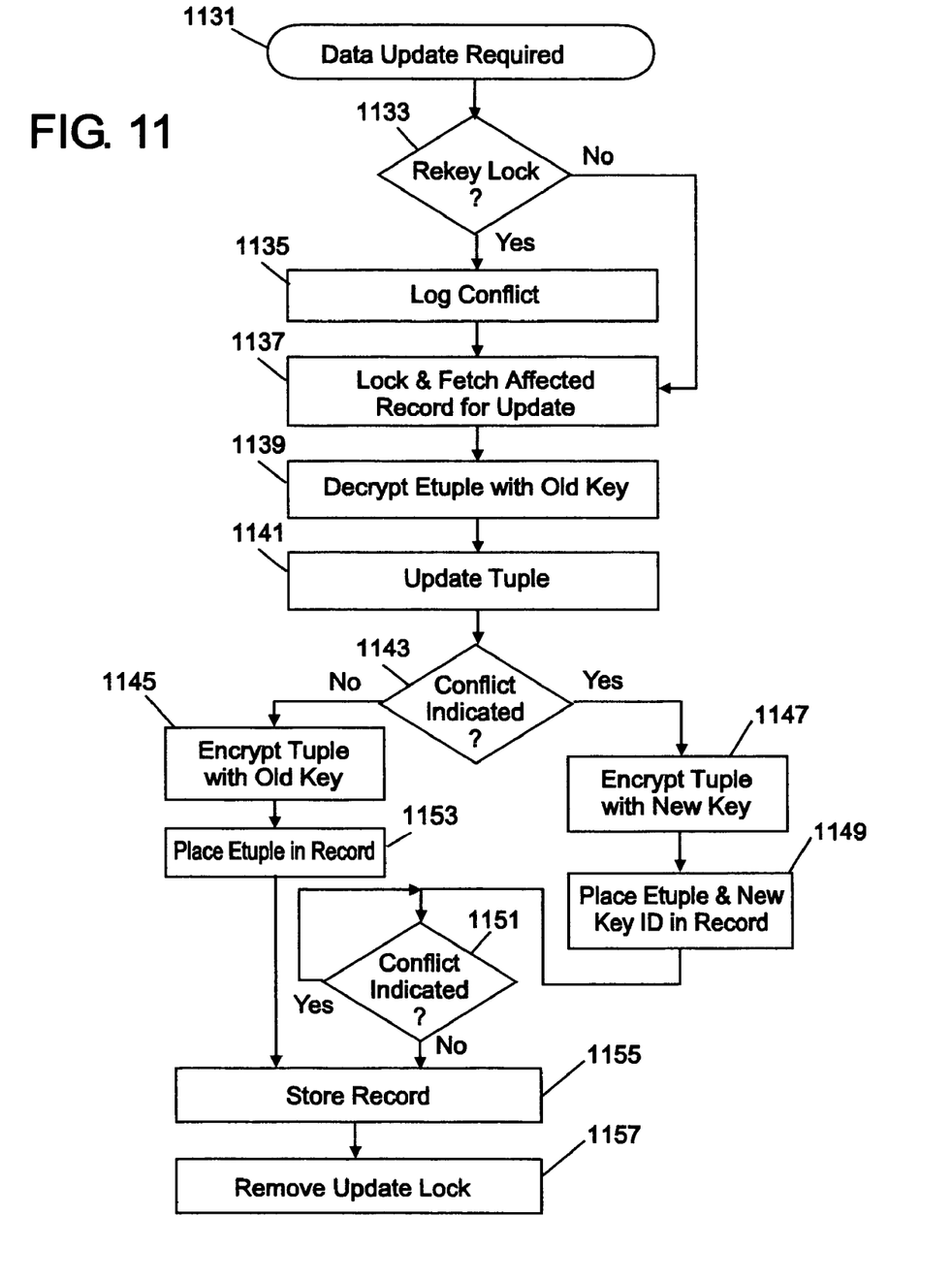
FIG. 11 is a flow diagram of data update while a new key is being installed.

The novel method, an embodiment of which is shown in FIGS. 10 and 11, reduces the contention between the client data transactions and the key updates thereby improving the system's concurrency performance. This is accomplished by allowing search, exclusive and data update transactions to be initiated after a key update transaction has started but the method does not allow a second key update to be started.

From a security perspective the lifetime of an encryption key should be limited and the key should be removed from active usage under certain circumstances. This determination is made at block 1001 of FIG. 10. The lifetime of a key can be determined from the Expiration value in the Key Registry. Periodic re-keying is considered to be a good practice, especially for data stored over an extended period of time to prevent a potential key compromise. If a key compromise is suspected or expected, an emergency re-keying has to be performed. In those cases, all affected keys should be changed.

Referring again to FIG. 10, a preferred embodiment of the method of the invention will be described.

The new key K1 is generated at block 1003 of FIG. 10 and a new key id K1ID is generated at block 1005. The new key K1 is then stored at 1007 in the key registry under the new key id K1ID.

A key update lock is placed on the affected record at the server and the record is fetched and sent to the client at block 1009. The old key is recovered from the key registry 701 by the key management 707 at block 1011. At block 1013 the etuple of the locked record is decrypted with an old key K identified in the key registry by old key id KID. The tuple recovered by the decryption is then re-encrypted at block 1015 with the new key K1. When the re-encryption is completed, the old content or tuple which is encrypted with the new key is inserted back into the record along with the new key id K1ID at block 1017. The new key id is then placed in the record at block 1019 and the record is returned to the database and unlocked at block 1021. At this point a determination is made at block 1023 whether the affected record has been also locked for data update. If the answer is no, then the process can return to block 1009 to update the key of another record or can return to block 1001 for generation of another key. If the affected record has been also locked for data update, the conflict indicator in key log 703 is reset at block 1025 before the process returns.

Figure 8:
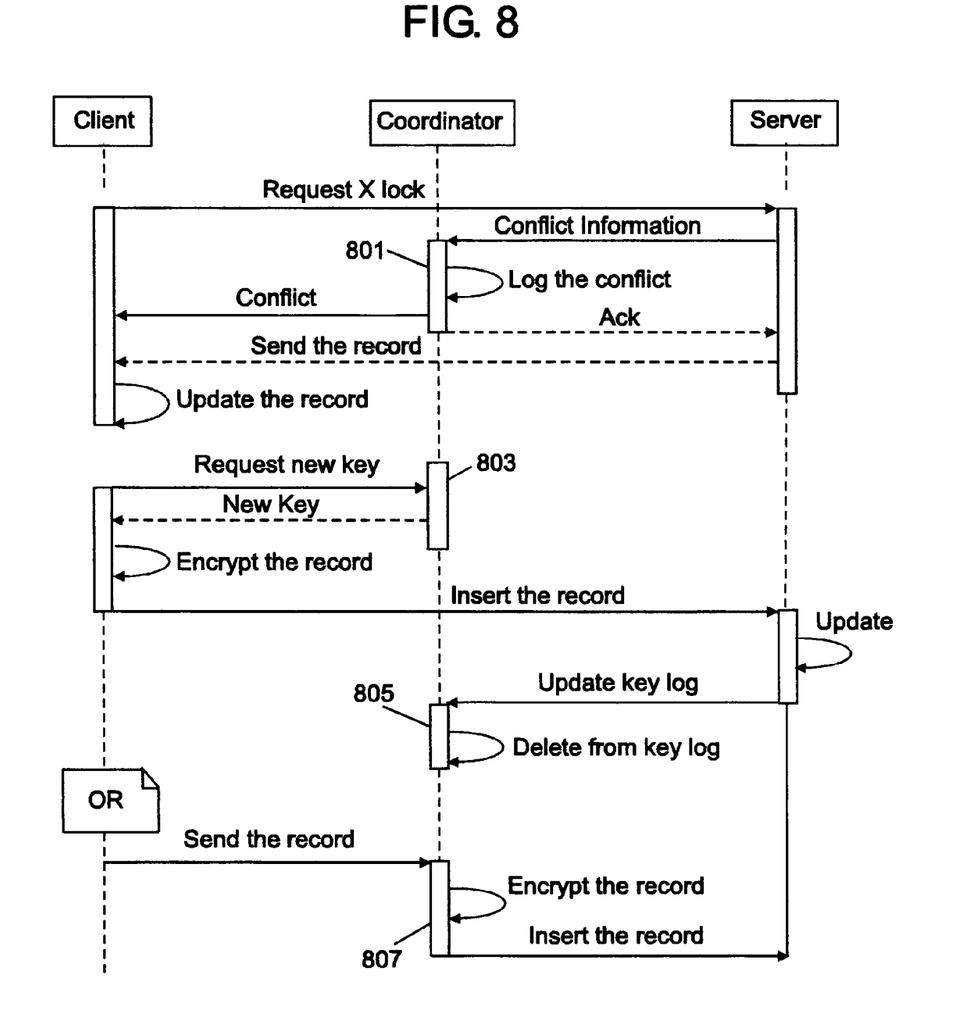
FIG. 8 shows lock management protocol according to the invention.

Turning now to FIG. 11, a concurrent data update transaction will be described. At block 1131 of FIG. 11, a data update request is received. At block 1133, a determination is made whether a rekey lock is already in place on the affected record. If the answer is NO, then the process goes directly to block 1137. If the answer is YES, the conflict indicator is set for the affected record in key log 703 at block 1135 and the process continues to block 1137. This step is also shown in FIG. 8 where the conflict is logged at 801 and conflict indication is sent on to the client and to the server as Ack. In this way the client knows to request a new key before completing the update transaction and the server knows that the client is aware of the conflict. At block 1137, a data update lock is placed on the affected record and the record is fetched and sent to the client for update. Again looking at FIG. 8, the existence of the conflict also can be sent to the client from the server along with the record being fetched. At the client, the old key identified by the key id in the record is used at block 1139 to decrypt the data etuple in the record for update of the data at block 1141.

Continuing in FIG. 11, a determination is made at block 1143 whether a conflict has been indicated between a key update and this data update transaction. If the answer is NO, then the updated data tuple is encrypted with the old key which is still the current key at block 1145. From block 1145, the process moves to block 1153 where the encrypted updated data etuple is placed into the record replacing the original etuple. From there the process moves directly to block 1155 where the updated record is stored and the update lock is removed from the record at block 1157.

If a determination is made at block 1143 that a conflict is indicated, the client requests the new key as shown at 803 of FIG. 8 and the updated data tuple is encrypted with the new key at block 1147 and the new key id and the encrypted updated data tuple is placed into the affected record at block 1149.

At this point in the process, the data are updated and ready to be stored but storage must wait for the rekey process to finish in order to avoid having the rekey process overwrite the updated data. Therefore at block 1151, the conflict indicator is again tested and testing continues in a loop until the rekey process finishes and the conflict indicator is removed as seen in FIG. 10. When the conflict is removed, the update process can complete by moving to block 1155 where the updated record is stored and the update lock is removed from the record at block 1157 as also shown at 805 in FIG. 8.

Referring back to FIG. 8, it will be understood that in the case where the decryption and encryption is performed at the coordinator, there is no need to send the conflict information to the client but instead the updated data are sent to the coordinator at 807 for encryption with the new key under control of the key management 707 in the coordinator.

An efficient key management embodiment of the invention has been described including means and methods to handle the key updates along with the other database transactions to improve concurrency performance. From the foregoing, it may be seen that the present invention overcomes the shortcomings of the prior art by allowing a data update transaction after a key update transaction has been started on the same record or group of records.

Having described the system, apparatus and method of the invention, it will be understood by those skilled in the art of computer systems that many additional modifications and adaptations to the present invention can be made in both embodiment and application without departing from the spirit of this invention.

Accordingly, this description should be considered as illustrative of the present invention which allows efficient key management in encrypted database environments, e.g., database-as-a-service.

What is claimed is:

1. A system comprising:
   a server computer in communication with at least one client computer through a communication network;
   the server computer comprising:
   lock management for allowing data stored in encrypted data storage on the server computer to be updated by an application program at a client computer while an encryption key protecting the data is concurrently being changed by placing a key update lock on a data record after receiving a key update request for the record and by placing a data update lock on the same record after receiving a data update request from a client computer for data update access to the same record and by sending conflict information to a client computer changing the encryption key, the requested record being made available to the data update requesting client computer after receiving an acknowledgement from the key update requesting client computer;
   the computer changing the encryption key comprising:
   key management for generating and storing data encryption keys used by a client computer to encrypt data stored on the server computer;
   a log recording a conflict of the existence of a key update lock and a data update lock on the same record when the server allows data update access to a record of the encrypted data selected by a query while a key update lock is in place against the record;

log management for sending the acknowledgement to the server computer and to the data update requesting client computer when the conflict has been logged;

the data update requesting client computer comprising:

a cryptographic and data processor for decrypting and updating the accessed data;

the cryptographic and data processor encrypting the updated data with an old key and storing the updated data at the server computer when a conflict indicator acknowledgement has not been received with the data to be updated;

the cryptographic and data processor encrypting the updated data with a new key when a conflict indicator acknowledgement has been received with the data to be updated and storing the updated data at the server computer after a conflict indicator at the server has been removed.

2. The system of claim 1, wherein the data update lock is an exclusive lock.

3. A system comprising:

a server computer in communication with at least one client computer through a communication network;

the server computer comprising:

lock management for allowing data stored in encrypted data storage on the server computer to be updated by an application program at a client computer while an encryption key protecting the data is concurrently being changed by placing a key update lock on a data record after receiving a key update request for the data record and by placing a data update lock on the same data record after receiving a data update request from a client computer for data update access to the same data record and by sending conflict information to the computer changing the encryption key, the requested data record being made available to the data update requesting client computer after receiving an acknowledgement from the key update requesting client computer, but preventing another computer from attempting to change the encryption key protecting the data while a key update lock is in place on the data record;

the server computer waiting to store updated data from the data updating client computer until after the key update is complete and a conflict indicator at the server has been removed.

4. A program product having computer readable code stored on a recordable media for use in a system comprising a server computer in communication with at least one client computer through a communication network, the program product comprising:

lock management computer useable program code for allowing data stored in encrypted data storage on the server computer to be updated by an application program at a client computer while an encryption key protecting the data is concurrently being changed by placing a key update lock on a data record after receiving a key update request for the record and by placing a data update lock on the same record after receiving a data update request from a client computer for data update access to the same record and by sending conflict information to the client computer changing the encryption key, the requested record being made available to the data update requesting client computer after receiving an acknowledgement from the key update requesting client computer;

key management computer useable program code for generating and storing data encryption keys used by a client computer to encrypt data stored on the server computer;

log recording computer useable program code at the client computer for recording a conflict of the existence of a key update lock and a data update lock on a same record when the server will allow data update access to the same record of the encrypted data selected by a query while a key update lock is in place against the same record;

log management computer useable program code at the client computer for sending the acknowledgement to the server computer when the conflict has been logged;

the lock management computer useable program code allowing updated data to be stored only after the recorded conflict has been removed by the key updating computer.

5. The program product of claim 4, wherein the lock management computer useable program code prevents another computer from attempting to change the encryption key protecting the data while a key update lock is in place on the data record.

* * * * *